(12) United States Patent
Carter et al.

(10) Patent No.: US 11,040,670 B2
(45) Date of Patent: Jun. 22, 2021

(54) ADJUSTABLE WORKING MACHINE OPERATOR DISPLAY SYSTEM

(71) Applicant: Caterpillar Paving Products Inc., Brooklyn Park, MN (US)

(72) Inventors: Joseph F. Carter, Blaine, MN (US); Michael J. Feesl, Inver Grove Heights, MN (US); Nicholas P. Borkovec, Lancaster, WI (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 81 days.

(21) Appl. No.: 16/199,618

(22) Filed: Nov. 26, 2018

(65) Prior Publication Data

US 2020/0164811 A1 May 28, 2020

(51) Int. Cl.
*B60R 11/02* (2006.01)
*B60K 37/06* (2006.01)

(52) U.S. Cl.
CPC .......... *B60R 11/0235* (2013.01); *B60K 37/06* (2013.01); *B60R 11/0264* (2013.01); *B60K 2370/67* (2019.05)

(58) Field of Classification Search
CPC ............. B60R 11/0229; B60R 11/0235; B60R 11/0258; B60R 11/0264; B60K 37/06; B62D 33/06; E02F 9/08; E02F 9/0858; E02F 9/16; E02F 9/20; E02F 9/2004
USPC ........................................ 296/190.01, 190.08
See application file for complete search history.

(56) References Cited

U.S. PATENT DOCUMENTS

| | | | |
|---|---|---|---|
| 4,421,190 A * | 12/1983 | Martinson | B60K 35/00 180/90 |
| 5,673,963 A | 10/1997 | Pietzsch | |
| 5,971,468 A * | 10/1999 | King | B60J 3/0204 296/97.5 |
| 6,039,141 A | 3/2000 | Denny | |
| 6,715,269 B2 | 4/2004 | Nanlawala et al. | |
| 6,724,317 B1 | 4/2004 | Kitano et al. | |
| 7,032,703 B2 | 4/2006 | Wulfert et al. | |
| 9,150,164 B2 | 10/2015 | Mitchell | |
| 9,702,112 B2 | 7/2017 | Shioji | |
| 9,712,741 B2 * | 7/2017 | Kothari | B60R 11/0235 |
| 10,434,914 B2 * | 10/2019 | Bittner | B60N 2/79 |
| 10,440,853 B2 * | 10/2019 | Muldowney | H05K 5/0017 |
| 2003/0230447 A1 * | 12/2003 | Wulfert | B60R 11/02 180/329 |

(Continued)

*Primary Examiner* — Jason S Daniels
(74) *Attorney, Agent, or Firm* — Schwegman, Lundberg & Woessner

(57) ABSTRACT

A work machine can include an operator station, an overhead control station, a first display mounting system, a second display mounting system, a first display device, and a second display device. The operator station can include a rotatable seat. The first display mounting system can be connected to the overhead control station. The first display device can be connected to the first display mounting system. The second display mounting system can be connected to the rotatable seat, and the second display device can be connected to the second display mounting system. The first display mounting system can be operable to selectably adjust a position of the first display device relative to the overhead control station, and the second display mounting system can be operable to selectably adjust a position of the second display device relative to the rotatable seat.

15 Claims, 5 Drawing Sheets

(56) References Cited

U.S. PATENT DOCUMENTS

| | | | |
|---|---|---|---|
| 2008/0258535 A1* | 10/2008 | Berning ................ | E01C 23/127 299/39.4 |
| 2016/0096554 A1* | 4/2016 | Klein .................... | B60K 35/00 296/190.01 |
| 2019/0389282 A1* | 12/2019 | Wang .................... | B60J 3/0278 |

* cited by examiner

ADJUSTABLE WORKING MACHINE OPERATOR DISPLAY SYSTEM

TECHNICAL FIELD

The present application relates generally to working machine displays. More particularly, the present application relates to adjustable displays for working machines.

BACKGROUND

Working machines can include cabs that slide laterally, and seats that pivot 180 degrees, for example. These features enhance visibility by creating flexibility for job site uniqueness. The cab position and seat position can be manipulated on-the-fly, and therefore it is desirable to also be able to quickly adjust the position and viewing angles of working machine displays to accommodate the multiple operator position setups.

U.S. Pat. No. 5,673,963 to Pietzsch discloses an overhead monitor with a screen that pivots around one axis and tilts around another axis. However, it is desirable to have greater freedom when controlling the position and orientation of displays within a working machine.

SUMMARY OF THE INVENTION

In one example, a work machine can include an operator station, an overhead control station, a first display mounting system, a second display mounting system, a first display device, and a second display device. The operator station can include a rotatable seat. The first display mounting system can be connected to the overhead control station. The first display device can be connected to the first display mounting system. The second display mounting system can be connected to the rotatable seat, and the second display device can be connected to the second display mounting system. The first display mounting system can be operable to selectably adjust a position of the first display device relative to the overhead control station, and the second display mounting system can be operable to selectably adjust a position of the second display device relative to the rotatable seat.

In another example, work machine can include an operator seat, first and second display mounts, and first and second display devices. The operator seat can be rotatably connected to the work machine. The first display mount can be connected to a component of the work machine that is in a fixed position relative to the seat. The first display device can be connected to the first display mount. The second display mount can be connected to the seat, and the second display device can be connected to the second display mount. The first display mount can be configured to selectably adjust a position of the first display device relative to the work machine, and the second display mount can be configured to selectably adjust a position of the second display device relative to the seat.

In another example, a rotary mixer can include a frame, a first display, and an operator station. The first display can be mounted at an overhead control station through a first mounting system. The operator station can include a seat rotatable relative to the frame, and a second display mounted to the seat through a second mounting system. The first mounting system can be configured to permit movement of the first display relative to the operator station, and the second mounting system can be configured to permit movement of the second display relative to the seat.

DETAILED DESCRIPTION

Figure 1:
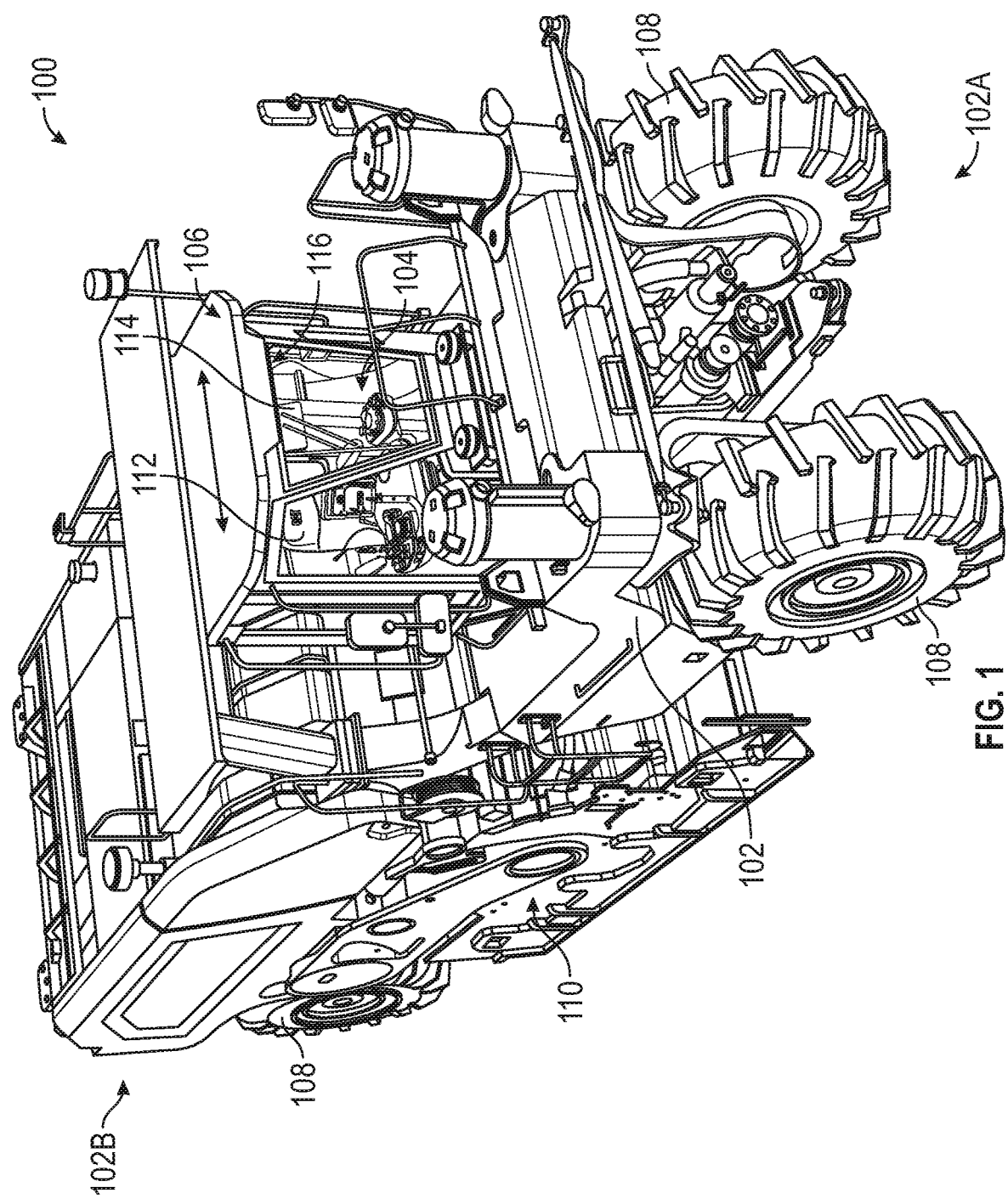
FIG. 1 is a perspective view illustrating a rotary mixer.

FIG. 1 is a perspective view illustrating a rotary mixer 100 according to one example of the present disclosure. While illustrated and described as a rotary mixer, the working machine can be any construction, industrial or other light or heavy working machine. Accordingly, although several examples are described with reference to a rotary mixer, examples according to this disclosure are also applicable to other types of machines including compactors, graders, scrapers, dozers, excavators, material haulers, and other example machine types.

The rotary mixer 100 includes a frame 102 to support various components of the rotary mixer 100, such as an engine (not shown), a power train (not shown) and an operator station 104 positioned within a cab 106. The frame 102 further defines a front end 102A and a rear end 102B. The engine, the power train and the operator station 104 are disposed between the front end 102A and the rear end 102B of the frame 102. The operator station 104 may include control levers and/or switches for an operator to control various operations, such as a reclaiming operation and forward/reverse travel of the rotary mixer 100. The rotary mixer 100 further includes a set of ground engaging members 108 disposed adjacent to each of the front end 102A and the rear end 102B of the frame 102. In the embodiment illustrated in FIG. 1, the ground engaging members 108 are wheels. In other embodiments, one or more of the ground engaging members 108 may be a track. The set of ground engaging members 108 may be drivably coupled to the engine for moving the rotary mixer 100 over the work surface.

The rotary mixer 100 further includes a mixing chamber 110 for reclaiming and pulverizing the work surface. The mixing chamber 110 is supported from the frame 102 between the sets of engaging members 108. The mixing chamber 110 includes a rotor housing and a rotor rotatably disposed within the rotor housing. The rotor is configured to contact the work surface during travel of the rotary mixer 100 to reclaim and/or pulverize the work surface. The rotor is also configured to mix reclaimed soil with various additives or aggregates deposited on the work surface. The rotor may be drivably coupled to the engine via the power train. In an example, the rotor contains a plurality of cutting tools used to mix and/or pulverize the work surface. In various embodiments, a height of the mixing chamber 110 with respect the work surface may be adjusted by moving the mixing chamber 110 relative to the frame 102 via one or more actuators.

The cab 106 is configured to move laterally as illustrated by the arrows in FIG. 1. The operator station 104 includes a seat 112 in which an operator of rotary mixer 100 can be seated. Control of the lateral movement of the cab 106 may be achieved using a keypad, for example, which may be part of the operator station 104, or any other electronic or mechanical means of controlling movement of the cab 106. The cab 106 may be positioned at any point between left and right range limits, and an operator can move the position of the operator station 104 during operation of the rotary mixer 100. This way, an operator can improve viewing of both the environment and the rotary mixer 100 on-the-fly.

The operator station 104 also includes an overhead display 114 attached to an operator control station 116 of the cab 106. The display 114 can be a liquid crystal display (LCD), a light-emitting diode (LED) display, or any other type of display capable of outputting graphical data for the operator. For example, the display 114 can be configured to display images and/or video from cameras (not shown) placed about rotary mixer 100 to provide the operator with enhanced views, for example, of the front and/or rear of the rotary mixer 100.

Figure 2:
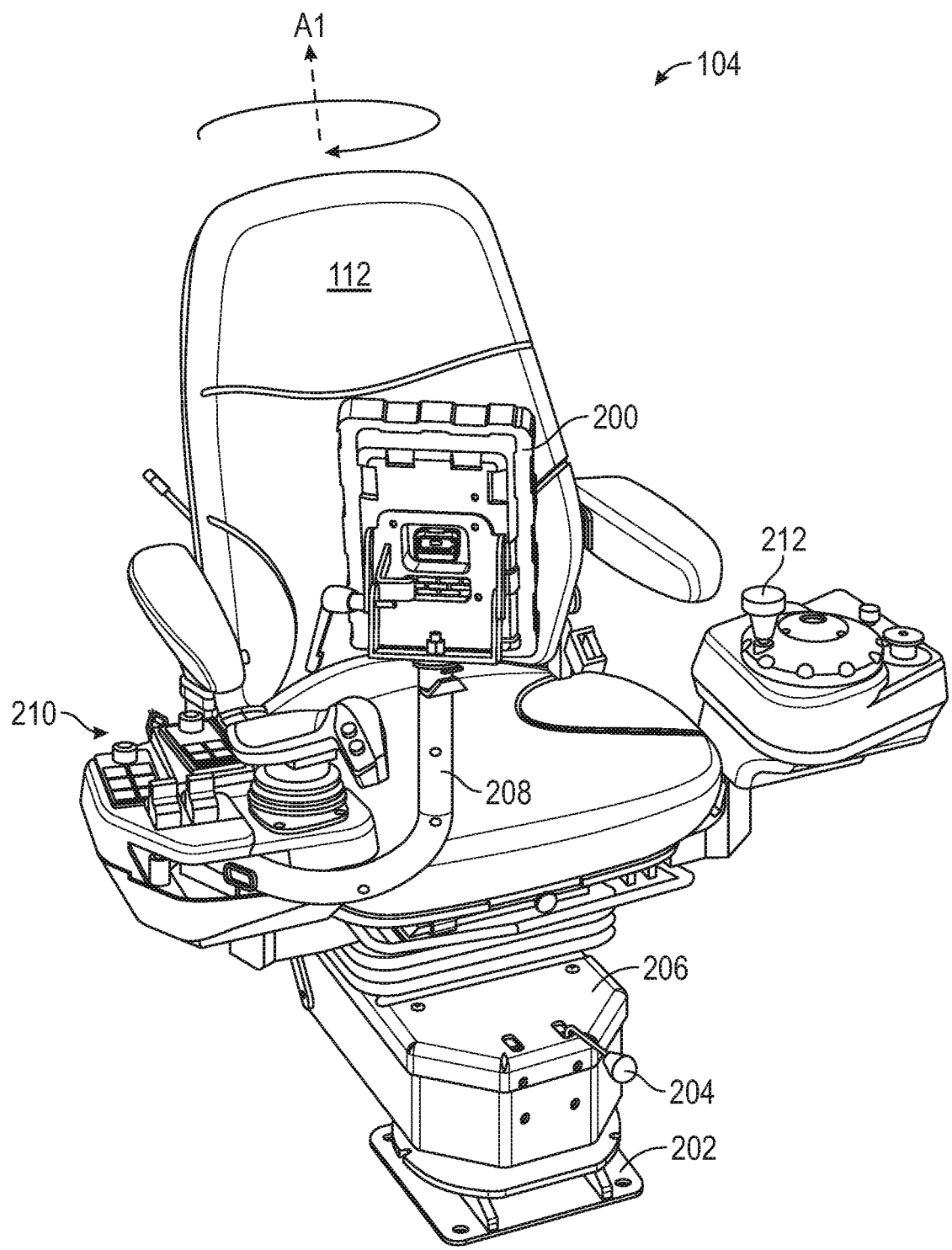
FIG. 2 is a perspective view illustrating an operator station of a rotary mixer.

FIG. 2 is a perspective view illustrating the operator station 104 of the rotary mixer 100 along with an attached display 200. As illustrated by the circular arrow in FIG. 2, the seat 112 of the operator station 104 is capable of pivoting about an axis A1 to enhance viewing of the environment for an operator seated in the seat 112. The seat 112 is attached to the frame of the cab 106 through a mount 202. The mount 202 is any mechanical structure capable of securing the seat 112 to the frame of the cab 106 via roller bearings, for example. The mount 202 can be secured to the frame using bolts, screws, pins, rivets, or any other type of fastener.

An operator seated in the seat 112 can control a rotary position of seat 112 using a lever 204. For example, an operator can push or pull the lever 204 to "unlock" the seat 112. In one example embodiment, the operator can use bodily motion, for example, to rotate the seat 112 into a desired position. In other example embodiments, electronic or mechanical control inputs can be used to control rotation of the seat 112 by the operator. To permit this rotary motion, the mount 202 is rotatably connected to a seat base 206 through a rotatable joint, for example. The joint can be any joint that permits the seat 112 to rotate about the axis A1. In some example embodiments, the joint can be any type of revolute joint, such as a hinge, that only permits rotational movement about the single axis A1. In other example embodiments, the joint can be a ball joint, planar joint, or other joint that permits rotational movement of the seat 112 about another axis (not shown). The operator can then push or pull the lever 204 back into a "locked" position to lock the seat 112 in the desired position. In one example embodiment, the seat 112 can pivot 90 degrees right and/or 90 degrees left. In other embodiments, the seat 112 can pivot 360 degrees, or any other amount desired based on the needs of the system.

The display 200 is attached to the seat 112 through an arm 208, which connects the display 200 to the seat 112 at a control panel 210. In other embodiments, the display 200 can connect to the seat 112 at any other location. While illustrated as an arm 208, the display 200 can connect to the seat 112 through any other type of mechanical mounting member. Various controls are included in the control panel 210 that are configured to allow an operator seated in the seat 112 to control aspects of the rotary mixer 100. For example, the control panel 210 can include a keypad configured to receive input from an operator to control lateral movement of the cab 106, a joystick configured to receive input from the operator to control implements of the rotary mixer 100, and any other input/output devices configured to provide the operator with control of the rotary mixer 100. The operator station 104 also includes steering handwheel 212, which can be operated to steer the rotary mixer 100.

The display 200 can be an LCD or LED touchscreen, for example, that provides output for, and receives input from, an operator of rotary mixer 100. For example, the display 200 can provide further controls for an operator beyond that provided by control panel 210. Operational information regarding the rotary mixer 100 can be displayed on the display 200, and the user can provide further input to control rotary mixer 100 through the display 200. In other example embodiments, the display 200 can be a non-touchscreen display that receives input from an operator through the control panel 210.

Figure 3A:
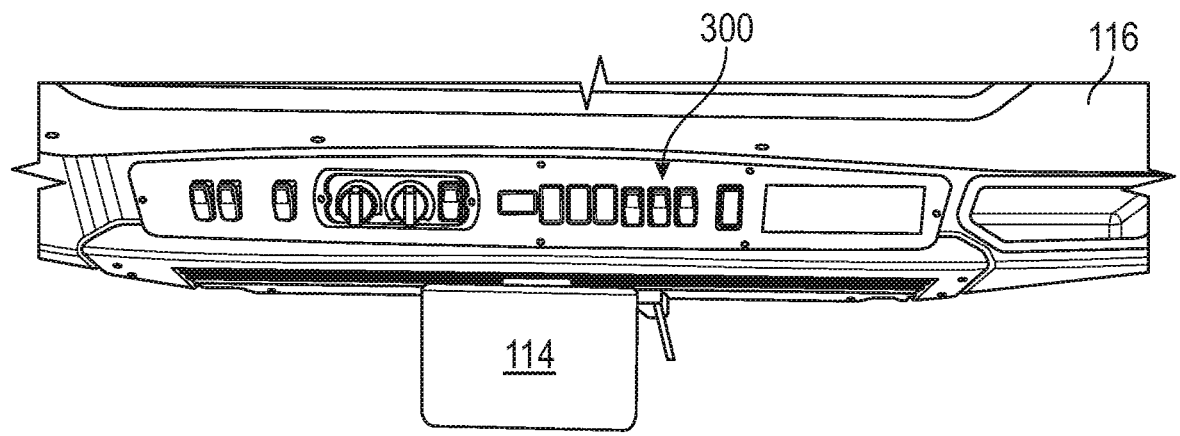
FIGS. 3A and 3B are perspective views illustrating an overhead display and mounting system of a rotary mixer.
Figure 3B:
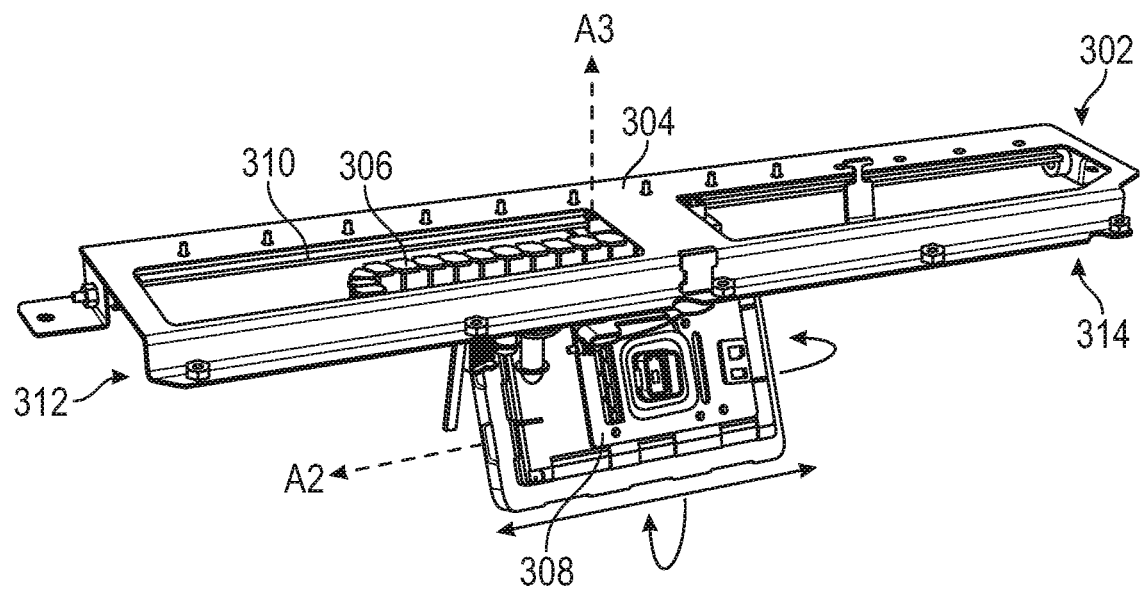

FIGS. 3A and 3B are perspective views illustrating the overhead display 114 of the rotary mixer 10X). FIG. 3A is a perspective view of an overhead control station 300 with the display 114 mounted thereto. The overhead control station 300 may be the operator control station 116 illustrated in FIG. 1. The overhead control station 300 can include further controls for rotary mixer 100 for use by an operator within the cab 106. For example, the overhead control station 300 can include, among other controls, environmental controls for the interior of the cab 106.

FIG. 3B is a perspective rear view illustrating a display mounting system 302. The mounting system 302 includes a mounting bracket 304, electrical carrier 306, a display mount 308, and a display track 310. The display 114 can move laterally along axis A2 from a leftmost position 312 to a rightmost position 314 and is capable of tilting forward and backward about axis A2 and rotating about axis A3 as illustrated by the arrows in FIG. 3B. In one example embodiment, axes A2 and A3 are orthogonal. The mounting system 302 attaches to the operator control station 116 within the cab 106 of the rotary mixer 100 through the mounting bracket 304 such that the mounting system 302 is fixed with respect to the cab 106. The mounting bracket 304 can be connected to the cab 106 at the operator control station 116 using bolts, screws, pins, rivets, or any other types of fasteners.

In the embodiment illustrated in FIG. 3B, the display mount 308 slides axially along axis A2 on the display track 310. The electrical carrier 306 is connected between the display mount 308 and the mounting bracket 304 and is configured to carry electrical wires as the display 114 slides along the display track 310.

The display mount 308 can be connected to the display track in any way such that the display mount 308 is slidable along the display track 310. For example, the display mount 308 can include wheels, balls, gears, or any other movement elements configured to interface with the display track 310 to permit low friction movement of the display mount 308 along the display track 310. In one example embodiment, the movement elements can mate with a groove of the display track 310. In another example embodiment, the display track 310 can be a chamber within the mounting bracket 304 within which the movement elements operate. The display mount 308 can be connected to the movement elements through an opening into the chamber. In other example embodiments, the display track 310 can be a ridge, and the display mount 308 can include a bracket that fits around the display track 310, the bracket having low friction surfaces that engage with the display track 310 without the need for movement elements. While illustrated at an edge of the mounting bracket 304, the display track 310 can be located at any location about mounting bracket 304 that permits lateral motion of the display 114 between the leftmost position 312 and the rightmost position 314. In other embodiments, the mounting bracket 304 may not include a display track 310 and display 114 may be moveable along the axis A2 using other methods including, for example, a belt and pulley system connected to mounting bracket 304.

Figure 4A:
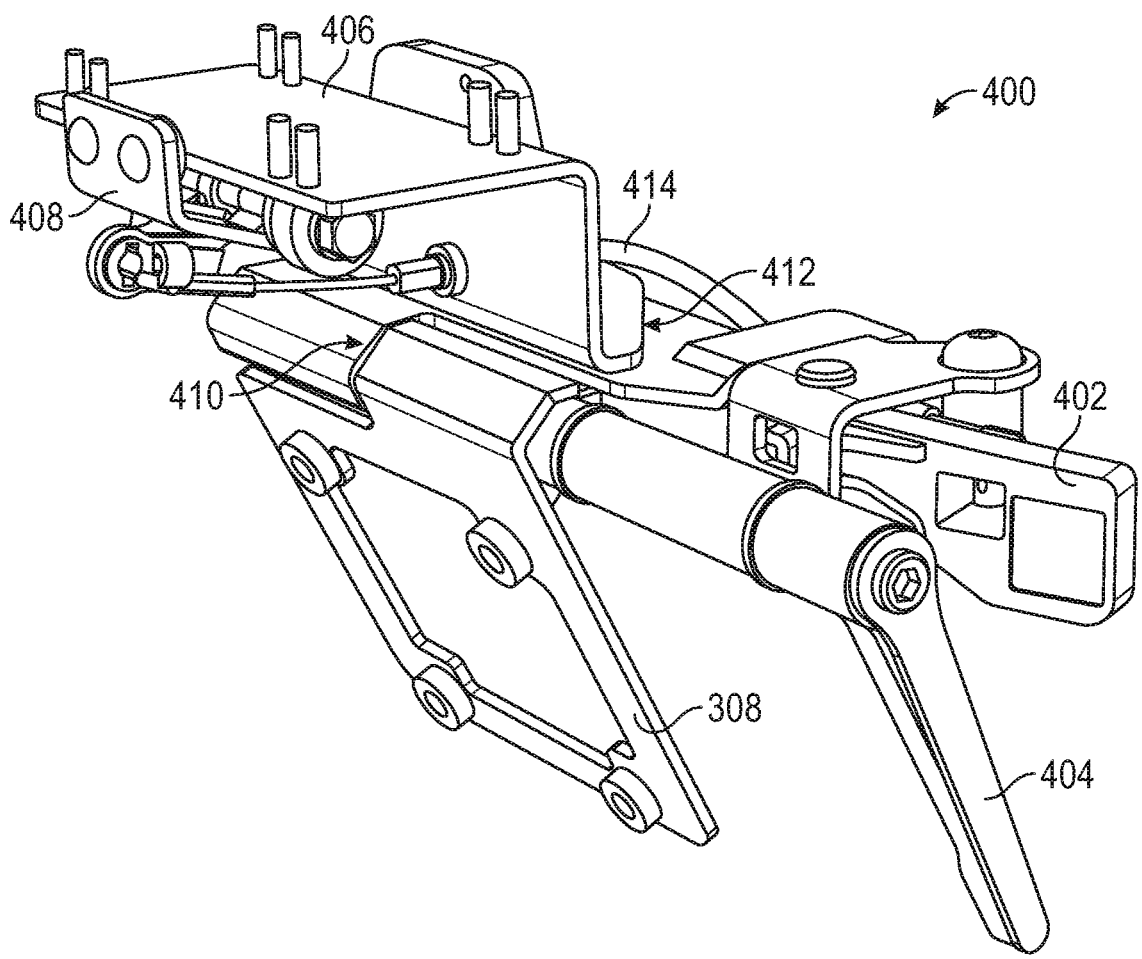
FIGS. 4A and 4B are perspective views illustrating a control system of an overhead display mounting system.
Figure 4B:
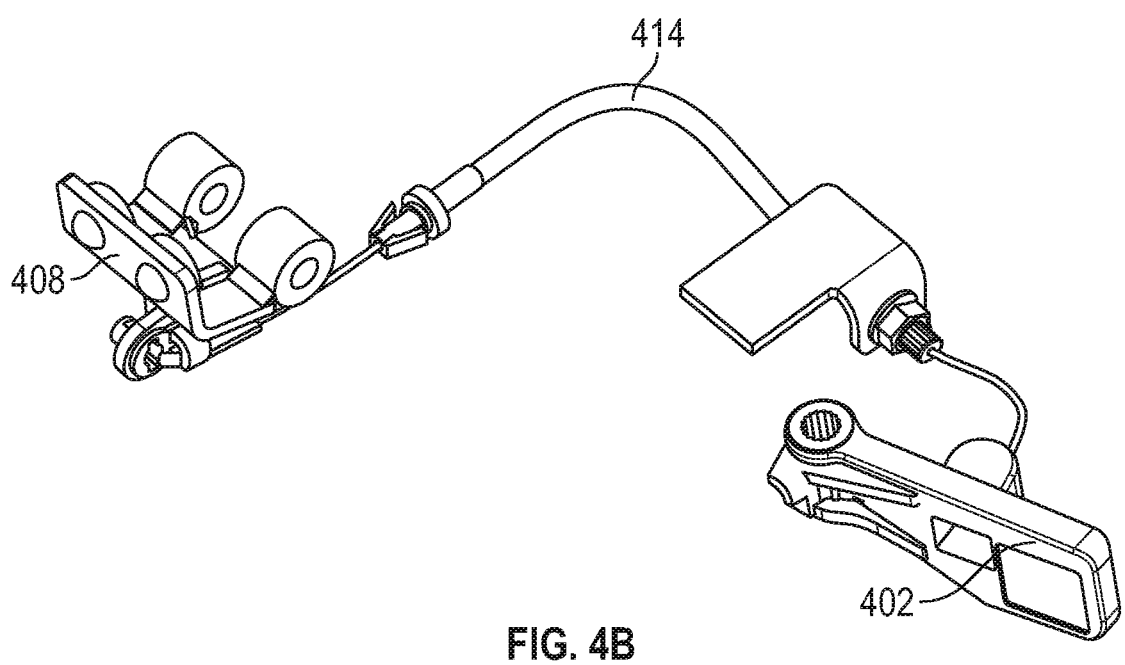

FIGS. 4A and 4B are perspective views of an example control and brake system for the overhead display 112. FIG. 4A is a perspective view of a control system 400 of the overhead display 112 of the rotary mixer 100. The control system 400, which is part of the display mounting system 302, includes the display mount 308, a flip handle 402, a turn handle 404, a slidable mounting bracket 406, a brake 408, a hinge 410, a pivoting bracket 412, and a brake cable 414. The display 114 can be connected to the display mount 308 using screws, bolts, pins, rivets, or any other type of fasteners. The display mount 308 can tilt forward and backward through hinge 410. While illustrated as a hinge in FIG. 4A, the hinge 410 can be any revolute, cylindrical, pin-slot, planar, or other joint that allows rotation about the axis A2 (FIG. 3B). The display mount 308 can also rotate about axis A3 (FIG. 3B) through the joint between the slidable mounting bracket 406 and the pivoting bracket 412. This joint can be a hinge joint, cylindrical joint, pin-slot joint, planar joint, or any other joint that permits rotation about axis A3. In other example embodiments, the hinge 410 and the joint between the slidable mounting bracket 406 and the pivoting bracket 412 can be replaced with a single ball joint or other spherical joint to allow rotation about both axes A2 and A3 (FIG. 3B).

The turn handle 404 can be used to tilt the display 114 forward and backward about axis A2. For example, the turn handle 404 can be connected to the display mount 308 through the hinge 410 or other rotatable joint. When the turn handle 404 is pushed or pulled, the display mount tilts in the respective direction. The turn handle 404 can also be used by the operator to rotate the display about the axis A3 by applying an angular pushing or pulling force to the turn handle 404, which can rotate the entirety of the control system 400 below the pivoting bracket 412.

The flip handle 402 can be used to lock and unlock the display 114 from any rotational or axial movement. For example, the flip handle 402 can be pulled or pushed into an unlocked position to permit lateral movement, tilting movement, and rotational movement of the display 114. An operator can then move the display 114 axially along axis A2 to a desired position between the leftmost position 312 and the rightmost position 314. Once the display 114 is in the desired position, the operator can push or pull the flip handle 402 back into the locked position to lock the display 114 in place. In the example illustrated in FIGS. 4A and 4B, the flip handle 402 can be pushed to unlock the display 114 through brake cable 414 and can be pulled to apply the brake 408 through tension of brake cable 414. While illustrated as a cable brake system 408, any other type of brake system may be utilized to selectably limit movement of the display 114.

While the examples illustrated in FIGS. 4A and 4B include a turn handle and a brake system, other examples can include other methods of controlling movement of the overhead display 114. For example, components of the display mounting system 302 can include built-in resistive forces. In an example, a user may pivot the display 114 about the axes A2 and A3 by applying a force directly to the display 114. Resistive forces may then hold the display in the desired position about the axes A2 and A3. The built-in resistive forces for the display mounting system 302 can also hold the display 114 in position along the display track 310. A user can apply force directly to the display 114 to move the display 114 laterally along the axis A2. In this example, many of the components of the control system 400 can be eliminated.

Figure 5:
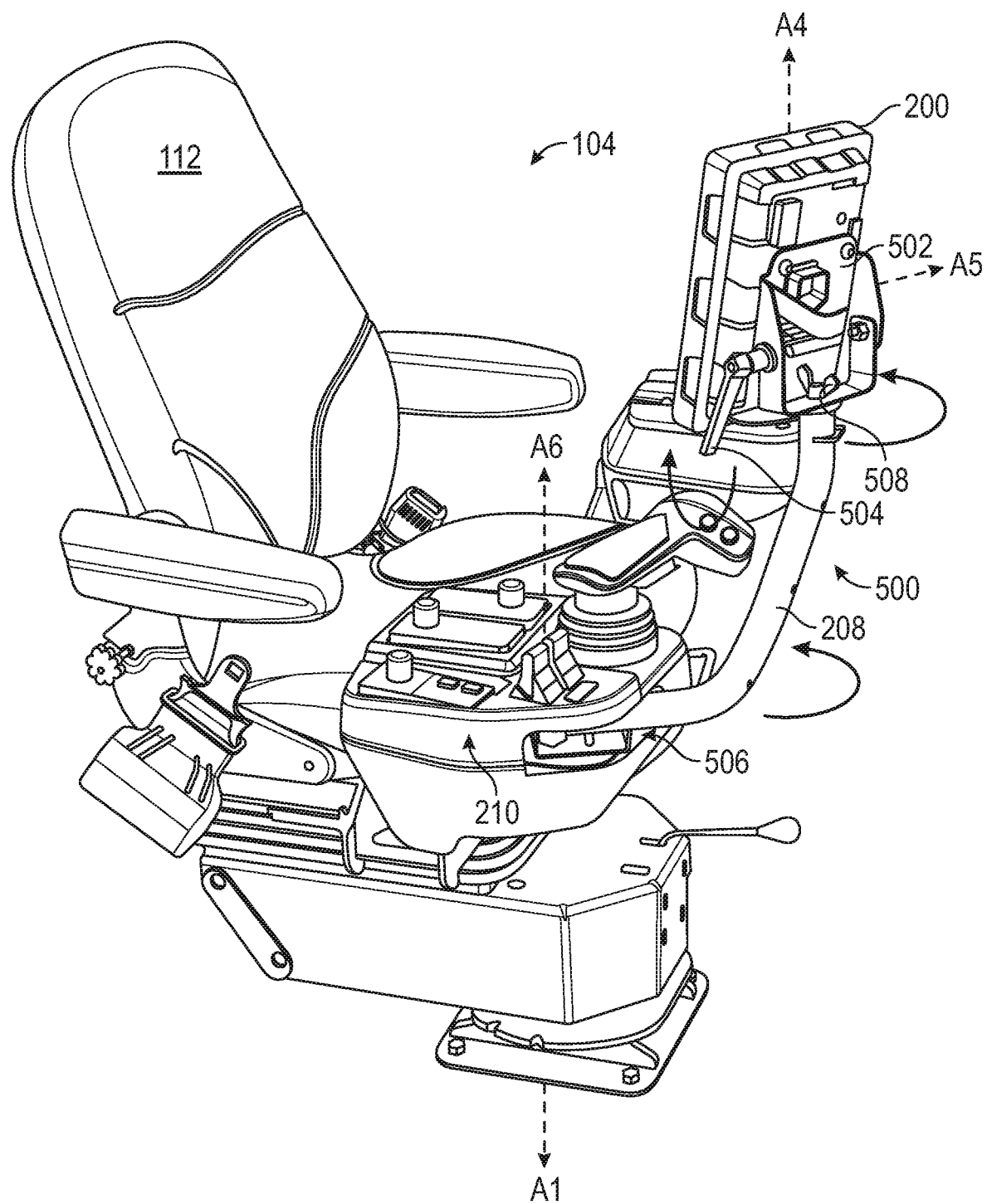
FIG. 5 is a perspective view of an operator station that includes a movable display unit.

FIG. 5 is a perspective view of the operator station 104 that includes the display 200. The display 200 is mounted to seat 112 through a mounting system 500. The mounting system 500 includes the arm 208, a display mount 502, a turn handle 504, and an arm mount 506. The display 200 is connected to mounting system 500 through the display mount 502 using screws, bolts, pins, rivets, or any other type of fasteners.

In one example embodiment, the display mount 502 is connected to the arm 208 through a connector 508, which may be a bolt, screw, or other non-permanent type of connector. The display mount 502 is rotatable with respect to arm 208 about an axis A4. In one example embodiment, the connector 508 is a nut and bolt and may be loosened by an operator. The display 200 can then be rotated to a desired position, and the connector 508 can be re-tightened to lock the display 200 into the desired position. In other example embodiments, any other type of revolute, cylindrical, planar, or other rotatable joint may be used to connect the display mount 502 to the arm 208 to permit rotation about the axis A4. For example, a hinge may be used to connect the display mount 502 to the arm 208 and may or may not include a locking mechanism to lock the hinge in a desired position.

The display 200, through the display mount 502, can also tilt forward and backward about an axis A5. In one example embodiment, the axes A4 and A5 are orthogonal. In an example, tilting can be achieved by an operator through the turn handle 504. In one example, the display mounting system 500 may have built in resistive force to movement of the turn handle 504 so that the display 200 does not move when the turn handle 504 is not being handled by an operator. In other embodiments, a separate locking mechanism (not shown) may be included to lock and unlock the tilting motion of the display 200. In other examples, the turn handle 504 may not be included, and a user can apply force directly to the display 200 to tilt the display 200. The display mount 502 can include a hinge or other rotatable joint to permit rotation of the display mount 502 about the axis A5. In other example embodiments, the revolute joints or other joints used to permit rotation of the display mount 502 about the axes A4 and A5 may be replaced by a single ball joint, planar joint, or other rotatable joint configured to permit rotation about both axes A4 and A5.

The display 200, through the arm 208, can rotate around the seat 112 about an axis A6. The arm 208 is connected to the seat 112 through the arm mount 506. The arm mount 506 can include a rotatable joint that permits rotation relative to the axis A6. The joint can be a hinge, cylinder joint, planar joint, pin-slot joint, or other rotatable joint. In one example embodiment, the arm mount 506 can have some built-in resistive force to movement of the arm 208 so that the display 200 does not move when the arm 208 is not being handled by an operator. In other embodiments, a separate locking mechanism (not shown) may be included to lock and unlock the angular motion of the arm 208.

INDUSTRIAL APPLICABILITY

Working machines can includes cabs that slide laterally, and seats that pivot 180 degrees, for example. These features enhance visibility by creating flexibility for job site uniqueness. Display mounting systems 302 and 500 allow a user to also adjust a position of the displays 114 and 200 on-the-fly to improve operator visibility and ergonomic preferences.

In one example, an operator is operating the rotary mixer 100 and has moved the cab 106 into the far-right position to improve visibility of the front right portion of the rotary mixer 100. The operator has also rotated the seat 112 45 degrees to the right. To improve visibility of the display 114 and of the outside environment, the operator moves the display 114 along the display track 310 to the rightmost position 314. The operator also rotates the display 114 45 degrees to the left and slightly tilts the display 114 downward to improve visibility of the display 114.

In addition to adjusting the display 114, the operator controls the arm 208 to move the display 200 around the seat 112 to the right. The operator also controls the turn handle 504 to tilt the display 200 slightly upward. This way, both displays 114 and 200 are in positions that allow easy visibility of the rotary mixer 100, the environment, and the displays 114 and 200. By utilizing the display mounting systems 302 and 500 in this way, visibility and ergonomics are improved for an operator of the rotary mixer 100.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:
   an operator station is disposed within a cab that is movably connected to the work machine, the operator station comprising a rotatable seat;
   an overhead control station;
   a first display mounting system fixedly connected to the overhead control station at least at a first end of the first display mounting system and at a second end of the first display mounting system opposite the first end;
   a first display device connected to the first display mounting system, the first display device can move, relative to the overhead control station, laterally along a fixed axis from a leftmost position to a rightmost position and is capable of tilting forward and backward about the fixed axis;
   a second display mounting system connected to the rotatable seat; and
   a second display device connected to the second display mounting system, wherein: the first display mounting system is operable to selectably adjust a position of the first display device relative to the overhead control station; and the second display mounting system is operable to selectably adjust a position of the second display device relative to the rotatable seat.

2. The work machine of claim 1, wherein the cab is laterally movable between left and right limits on the work machine.

3. The work machine of claim 1, wherein the first display mounting system comprises means for rotating the first display device relative to the overhead control station about a first axis of rotation.

4. The work machine of claim 3, wherein the first display mounting system comprises means for rotating the first display device relative to the overhead control station about a second axis of rotation, the second axis of rotation being different than the first axis of rotation, and one of the first axis of rotation or the second axis of rotation corresponding to said fixed axis.

5. The work machine of claim 1, wherein the second display mounting system comprises means for rotating the second display device relative to the seat about a first axis of rotation.

6. The work machine of claim 5, wherein the second display mounting system comprises means for rotating the second display device relative to the seat about a second axis of rotation, the second axis of rotation being different than the first axis of rotation.

7. The work machine of claim 6, wherein the second display mounting system comprises:
   a first mount member rotatably connected to the seat; and
   a second mount member connected to the second display device and rotatably connected to the first mount member.

8. The work machine of claim 7, wherein the second mount member comprises means for rotating the second display device about a third axis of rotation, the third axis of rotation being different than the first axis of rotation and the second axis of rotation.

9. A work machine comprising:
   an operator seat disposed within and rotatably moveable relative to a cab, the cab is moveable relative to a frame of the work machine;
   a first display mount connected to a component of the work machine, the first display mount is in a fixed position relative to the seat and disposed in the cab;
   a first display device connected to the first display mount, the first display device can move, relative to the first display mount and the operator seat, laterally along an axis from a leftmost position to a rightmost position within the cab and is capable of tilting forward and backward about the axis;
   a second display mount connected to the seat; and
   a second display device connected to the second display mount,
   wherein:
   the first display mount is configured to selectably adjust a position of the first display device relative to the work machine;
   the second display mount is configured to selectably adjust a position of the second display device relative to the seat;
   the first display mount is further configured to selectably adjust the position of the first display device by also permitting the first display device to rotate about a vertical axis orthogonal to said axis; and
   the vertical axis can move laterally along said axis with the first display device.

10. The work machine of claim 9, wherein the component of the work machine is an overhead control station of the work machine.

11. The work machine of claim 9, wherein the second display mount is configured to selectably adjust the position of the second display device by permitting the second display device to rotate about a first axis, rotate about a second axis orthogonal to the first axis, and rotate relative to the seat about a third axis.

12. The work machine of claim 9, wherein the second display mount comprises an arm connected between the second display device and the seat, and wherein the arm is configured to rotate relative to the seat about the third axis.

13. A rotary mixer comprising:
   a frame;
   a cab moveable relative to the frame;
   a first display mounted at an overhead control station through a first mounting system, the overhead control station disposed in the cab, the first display can move, within the cab, laterally along an axis from a leftmost position to a rightmost position and is capable of tilting forward and backward about the axis;

an operator station disposed in the cab comprising:
a seat rotatable relative to the frame; and
a second display mounted to the seat through a second mounting system;
wherein the first mounting system is configured to permit movement of the first display relative to the operator station;
wherein the second mounting system is configured to permit movement of the second display relative to the seat; and
wherein the first mounting system is configured to permit rotational movement of the first display about a vertical axis such that opposite ends of the first display device move by a same amount during the rotational movement about the vertical axis.

14. The rotary mixer of claim 13, wherein the first mounting system is configured to permit axial movement of the first display along a horizontal axis and rotational movement of the first display about the horizontal axis.

15. The rotary mixer of claim 13, wherein the second mounting system is configured to permit rotational movement of the second display about a first axis, rotational movement of the second display about a second axis orthogonal to the first axis, and rotational movement of the second display relative to the seat about a third axis.

* * * * *